United States Patent
Umeda et al.

(10) Patent No.: US 10,113,553 B2
(45) Date of Patent: Oct. 30, 2018

(54) CENTRIFUGAL COMPRESSOR WITH HOT GAS INJECTION

(71) Applicant: Daikin Applied Americas Inc., Minneapolis, MN (US)

(72) Inventors: Nobuhiro Umeda, Plymouth, MN (US); Md Anwar Hossain, Maple Grove, MN (US); Takatoshi Takigawa, St. Louis Park, MN (US)

(73) Assignee: DAIKIN APPLIED AMERICAS INC., Minneapolis, MN (US)

( * ) Notice: Subject to any disclaimer, the term of this patent is extended or adjusted under 35 U.S.C. 154(b) by 279 days.

(21) Appl. No.: 14/993,226

(22) Filed: Jan. 12, 2016

(65) Prior Publication Data

US 2017/0198707 A1 Jul. 13, 2017

(51) Int. Cl.
*F04D 29/048* (2006.01)
*F04D 27/02* (2006.01)
(Continued)

(52) U.S. Cl.
CPC ......... *F04D 27/0238* (2013.01); *F04D 17/10* (2013.01); *F04D 17/12* (2013.01);
(Continued)

(58) Field of Classification Search
CPC .. F04D 27/0238; F04D 29/048; F25B 49/027; F25B 49/022; F05D 2240/51; F05D 2270/1081
See application file for complete search history.

(56) References Cited

U.S. PATENT DOCUMENTS 3,901,620 A * 8/1975 Boyce .................... F04D 27/02
415/1
5,924,847 A * 7/1999 Scaringe ................. F04D 25/06
417/42

(Continued)

FOREIGN PATENT DOCUMENTS

WO          00/42366 A1    7/2000
WO    2009/058975 A1    5/2009
(Continued)

OTHER PUBLICATIONS

The International Search Report for the corresponding international application No. PCT/US2017/012966, dated Mar. 22, 2017.
(Continued)

*Primary Examiner* — Ninh H Nguyen
(74) *Attorney, Agent, or Firm* — Global IP Counselors, LLP

(57) ABSTRACT

A centrifugal compressor for a chiller includes a casing, an inlet guide vane, an impeller downstream of the inlet guide vane, a motor and a diffuser. The casing has inlet and outlet portions with the inlet guide vane disposed in the inlet portion. The impeller is rotatable about a rotation axis defining an axial direction. The motor rotates the impeller. The diffuser is disposed in the outlet portion downstream from the impeller with an outlet port of the outlet portion being disposed between the impeller and the diffuser. A hot gas injection passage is provided to inject hot gas refrigerant between the inlet guide vane and the impeller. A controller is programmed to control an amount of the hot gas refrigerant.

15 Claims, 11 Drawing Sheets

(51) Int. Cl.
  *F25B 49/02*  (2006.01)
  *F04D 17/10*  (2006.01)
  *F04D 25/02*  (2006.01)
  *F04D 27/00*  (2006.01)
  *F04D 29/058*  (2006.01)
  *F04D 29/28*  (2006.01)
  *F04D 29/42*  (2006.01)
  *F04D 29/44*  (2006.01)
  *F04D 29/58*  (2006.01)
  *F25B 1/053*  (2006.01)
  *F25B 41/06*  (2006.01)
  *F04D 17/12*  (2006.01)
  *F25B 25/00*  (2006.01)
  *F25B 31/00*  (2006.01)

(52) U.S. Cl.
  CPC ........... *F04D 25/02* (2013.01); *F04D 27/001* (2013.01); *F04D 29/048* (2013.01); *F04D 29/058* (2013.01); *F04D 29/284* (2013.01); *F04D 29/4206* (2013.01); *F04D 29/444* (2013.01); *F04D 29/582* (2013.01); *F25B 1/053* (2013.01); *F25B 41/062* (2013.01); *F25B 49/022* (2013.01); *F25B 49/027* (2013.01); *F05D 2240/51* (2013.01); *F05D 2270/101* (2013.01); *F25B 25/005* (2013.01); *F25B 31/008* (2013.01); *F25B 2339/047* (2013.01); *F25B 2341/0653* (2013.01); *F25B 2341/0661* (2013.01); *F25B 2600/0261* (2013.01); *F25B 2600/2501* (2013.01); *F25B 2600/2513* (2013.01); *F25B 2700/21161* (2013.01); *F25B 2700/21171* (2013.01); *F25B 2700/21173* (2013.01)

(56) References Cited

U.S. PATENT DOCUMENTS

| | | | |
|---|---|---|---|
| 8,021,104 B2* | 9/2011 | Gu | F04D 29/4213 |
| | | | 415/56.5 |
| 8,287,232 B2* | 10/2012 | Gu | F04D 27/0215 |
| | | | 415/56.5 |
| 8,522,549 B2* | 9/2013 | Sumser | F04D 29/685 |
| | | | 415/205 |
| 9,157,446 B2* | 10/2015 | Brasz | F04D 29/444 |
| 2013/0180272 A1 | 7/2013 | Ono et al. | |
| 2015/0167689 A1 | 6/2015 | Oda et al. | |

FOREIGN PATENT DOCUMENTS

| | | |
|---|---|---|
| WO | 2013/165841 A1 | 11/2013 |
| WO | 2014/158468 A1 | 10/2014 |

OTHER PUBLICATIONS

International Preliminary Report on Patentability for the corresponding international application No. PCT/US2017/012966, dated Jul. 17, 2018.

* cited by examiner

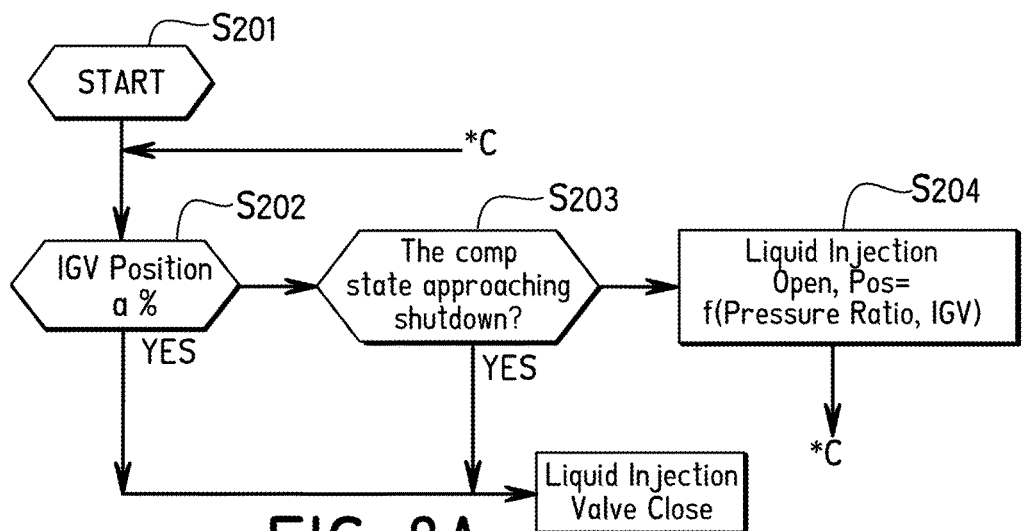
FIG. 8A
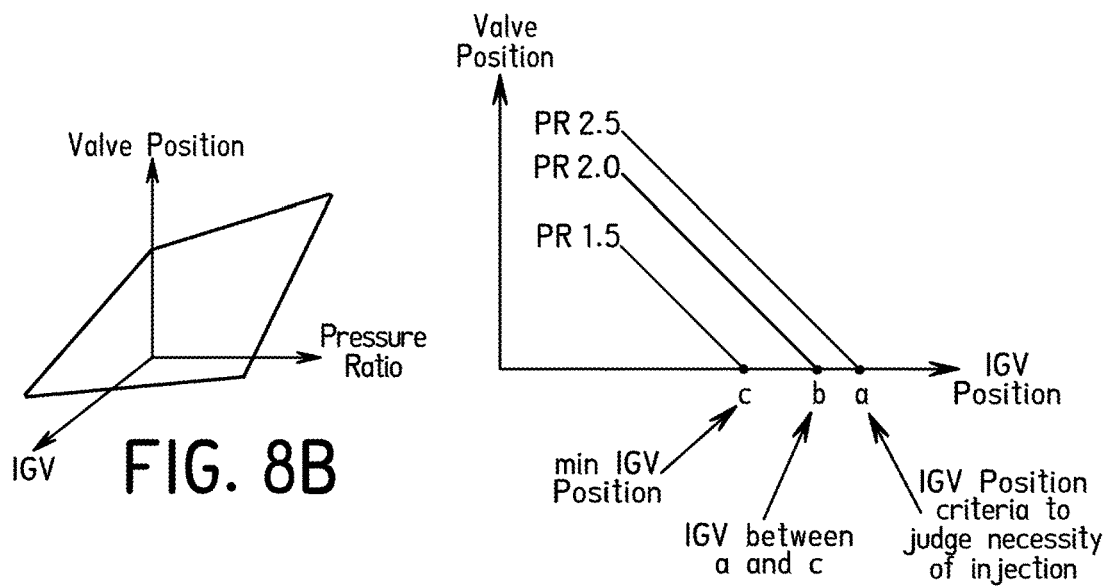
FIG. 8B
FIG. 8C
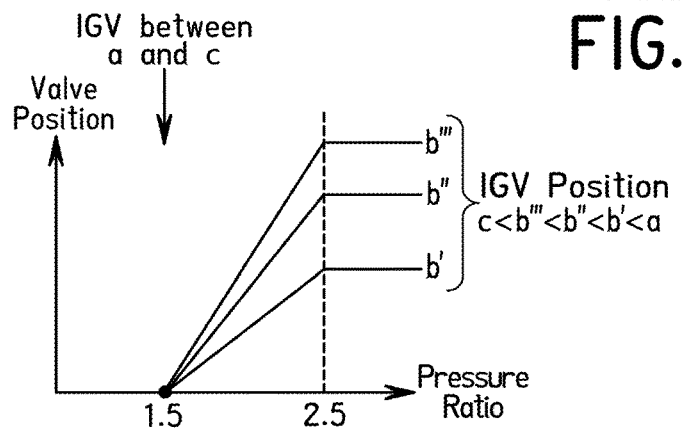
FIG. 8D

CENTRIFUGAL COMPRESSOR WITH HOT GAS INJECTION

BACKGROUND

Field of the Invention

The present invention generally relates to a centrifugal compressor. More specifically, the present invention relates to a centrifugal compressor with hot gas injection.

Background Information

A chiller system is a refrigerating machine or apparatus that removes heat from a medium. Commonly a liquid such as water is used as the medium and the chiller system operates in a vapor-compression refrigeration cycle. This liquid can then be circulated through a heat exchanger to cool air or equipment as required. As a necessary byproduct, refrigeration creates waste heat that must be exhausted to ambient or, for greater efficiency, recovered for heating purposes. A conventional chiller system often utilizes a centrifugal compressor, which is often referred to as a turbo compressor. Thus, such chiller systems can be referred to as turbo chillers. Alternatively, other types of compressors, e.g. a screw compressor, can be utilized.

In a conventional (turbo) chiller, refrigerant is compressed in the centrifugal compressor and sent to a heat exchanger in which heat exchange occurs between the refrigerant and a heat exchange medium (liquid). This heat exchanger is referred to as a condenser because the refrigerant condenses in this heat exchanger. As a result, heat is transferred to the medium (liquid) so that the medium is heated. Refrigerant exiting the condenser is expanded by an expansion valve and sent to another heat exchanger in which heat exchange occurs between the refrigerant and a heat exchange medium (liquid). This heat exchanger is referred to as an evaporator because refrigerant is heated (evaporated) in this heat exchanger. As a result, heat is transferred from the medium (liquid) to the refrigerant, and the liquid is chilled. The refrigerant from the evaporator is then returned to the centrifugal compressor and the cycle is repeated. The liquid utilized is often water.

A conventional centrifugal compressor basically includes a casing, an inlet guide vane, an impeller, a diffuser, a motor, various sensors and a controller. Refrigerant flows in order through the inlet guide vane, the impeller and the diffuser. Thus, the Inlet guide vane is coupled to a gas intake port of the centrifugal compressor while the diffuser is coupled to a gas outlet port of the impeller. The inlet guide vane controls the flow rate of refrigerant gas into the impeller. The impeller increases the velocity of refrigerant gas. The diffuser works to transform the velocity of refrigerant gas (dynamic pressure), given by the impeller, into (static) pressure. The motor rotates the impeller. The controller controls the motor, the inlet guide vane and the expansion valve. In this manner, the refrigerant is compressed in a conventional centrifugal compressor. The inlet guide vane is typically adjustable and the motor speed is typically adjustable to adjust the capacity of the system. In addition, the diffuser may be adjustable to further adjust the capacity of the system. The controller controls the motor, the inlet guide vane and the expansion valve. The controller can further control any additional controllable elements such as the diffuser.

When the pressure next to the compressor discharge is higher than the compressor discharge pressure, the fluid tends to reverse or even flow back in the compressor. This happens when the lift pressure (condenser pressure-evaporator pressure) exceeds the compressor lift capability. This phenomenon, called surge, repeats and occurs in cycles. The compressor loses the ability to maintain its lift when surge occurs and the entire system becomes unstable. A collection of surge points during varying compressor speed or varying inlet gas angle is called a surge surface. In normal conditions, the compressor operates in the right side of the surge surface. However, during startup/operation in part load, the operating point will move towards the surge line because flow is reduced. If conditions are such that the operating point approaches the surge line, flow recirculation occurs in the impeller and diffuser. The flow separation will eventually cause a decrease in the discharge pressure, and flow from suction to discharge will resume. Surging can cause damage to the mechanical impeller/shaft system and/or to the thrust bearing due to the rotor shifting back and forth from the active to the inactive side. This is defined as the surge cycle of the compressor.

Therefore, techniques have been developed to control surge. See for example U.S. Patent Application Publication No. 2013/0180272.

SUMMARY

In a conventional centrifugal compressor, a hot gas bypass may be provided to connect the discharge side of the compressor and the suction side of the compressor to expand the operation range of the compressor. While this technique works relatively well, this system requires a large-sized pipe for the hot gas bypass, which results in increased costs.

Also, in a case where a centrifugal compressor uses a magnetic bearing, gas turbulence may occur at an area between the inlet guide vane and the impeller when the inlet guide vane opening position is small so as to cause a shaft vibration in the magnetic bearing due to such gas turbulence. This makes the operation range of the centrifugal compressor smaller without an orbit error of the magnetic bearing.

Therefore, one object of the present invention is to provide a centrifugal compressor that expands the operation range of the compressor without increased costs.

Another object of the present invention is to provide a centrifugal compressor that reduces as turbulence at the area between the Inlet guide vane and the impeller.

One or more of the above objects can basically be attained by providing a centrifugal compressor adapted to be used in a chiller, the centrifugal compressor including a casing having an inlet portion and an outlet portion, an inlet guide vane disposed in the inlet portion, an impeller disposed downstream of the inlet guide vane, the impeller being attached to a shaft rotatable about a rotation axis, a motor arranged and configured to rotate the shaft in order to rotate the impeller, a diffuser disposed in the outlet portion downstream from the impeller with an outlet port of the outlet portion being disposed between the impeller and the diffuser, a hot gas injection passage arranged and configured to inject hot gas refrigerant between the inlet guide vane and the impeller, and a controller programmed to control an amount of hot gas refrigerant injected between the inlet guide vane and the impeller.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 8A is a flow chart illustrating a second method of liquid injection control using a variable degree expansion valve as the liquid injection valve, FIG. 8B is a graphical representation of a relationship among the opening degree of the liquid injection valve, the pressure ratio, and the inlet guide vane, and FIGS. 8C and 8D are graphs illustrating a relationship among the opening degree of the liquid injection valve, the pressure ratio, and the inlet guide vane;

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
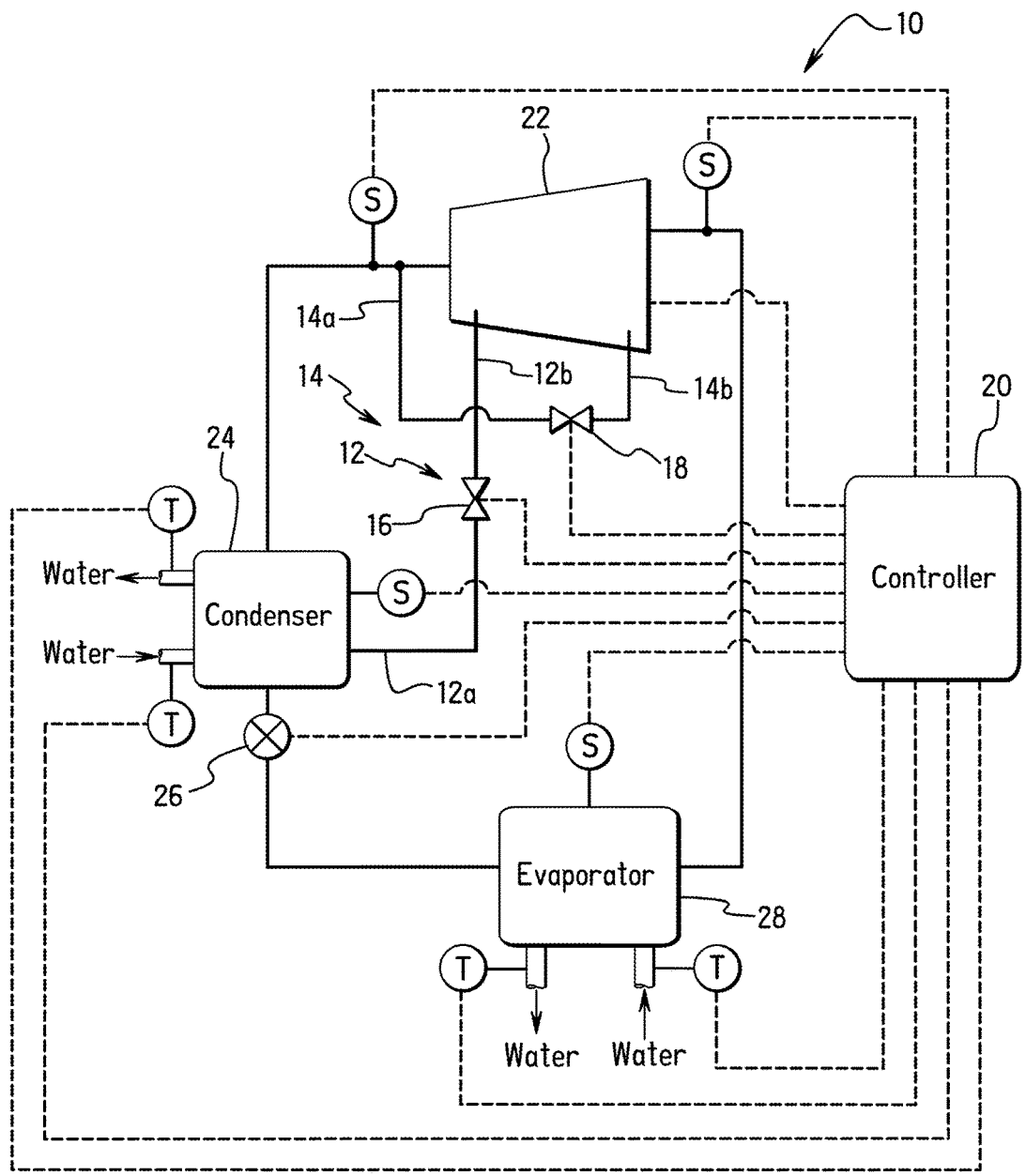
FIG. 1 illustrates a chiller in accordance with an embodiment of the present invention which includes both of a liquid injection passage and a hot gas bypass.
Figure 2:
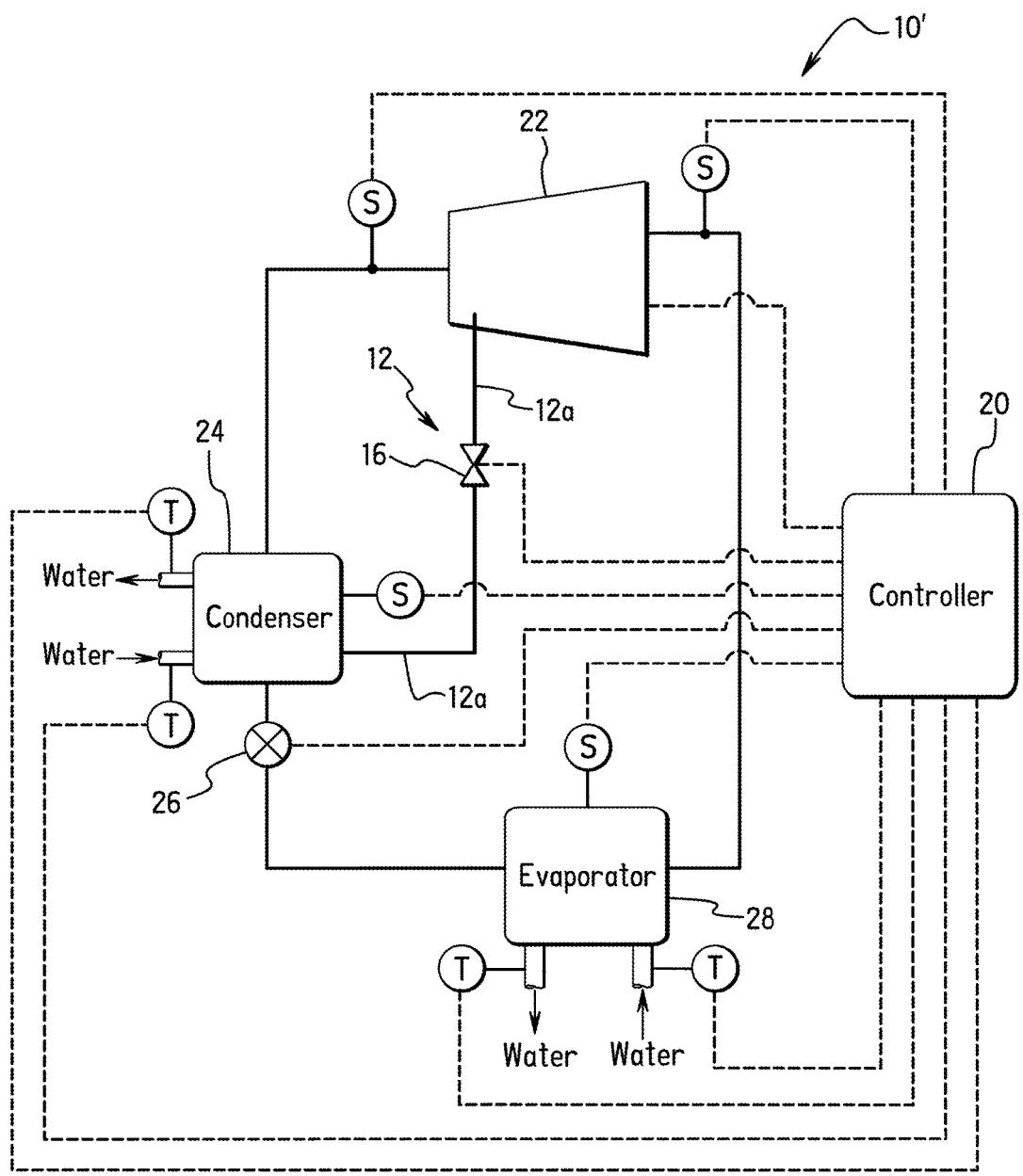
FIG. 2 illustrates a chiller in accordance with an embodiment of the present invention in which a hot gas bypass is omitted.
Figure 3:
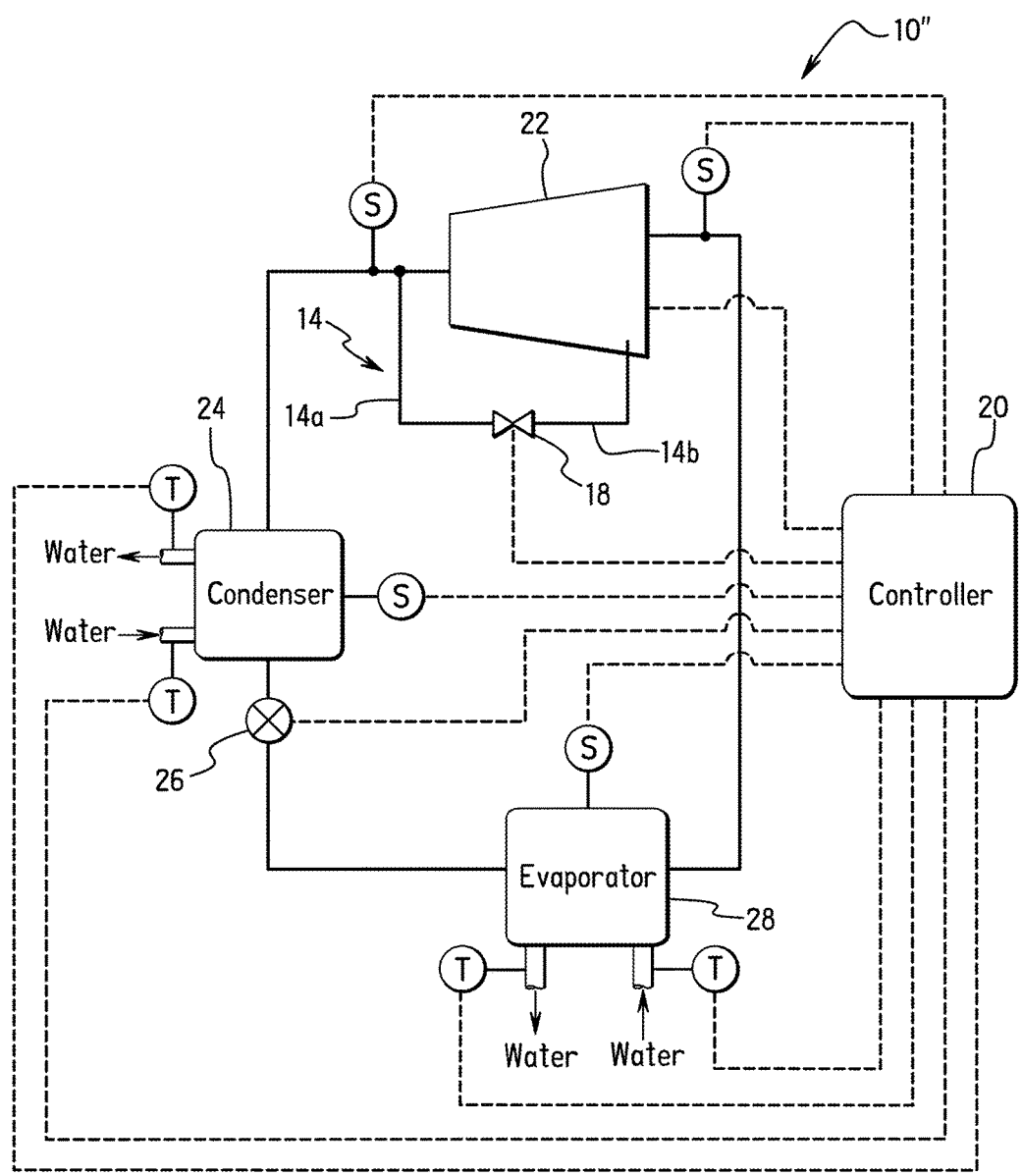
FIG. 3 illustrates a chiller in accordance with an embodiment of the present invention in which a liquid injection passage is omitted.

Referring initially to FIG. 1, a chiller system 10, which includes a liquid injection passage 12 and a hot gas bypass 14, is illustrated in accordance with an embodiment of the present invention. The liquid injection passage 12 basically includes a first pipe section 12a, a second pipe section 12b and a liquid injection valve 16 as shown in FIG. 2. The hot gas bypass 14 basically includes a first pipe section 14a, a second pipe section 14b and a hot gas valve 18 as shown in FIG. 3.

The chiller system 10 includes both of the liquid injection passage 12 and the hot gas bypass 14 as shown in FIG. 1. In accordance with another embodiment of the present invention, the liquid injection passage 12 or the hot gas bypass 14 may be omitted in the chiller system 10. More specifically, a chiller system 10' does not include the hot gas bypass 14 as shown in FIG. 2, and the chiller system 10" does not include the liquid injection passage 12 as shown in FIG. 3. In this manner, the chiller system can use both of the liquid injection and the hot gas injection, or can use either of the liquid injection and the hot gas injection.

The chiller system 10 is preferably a water chiller that utilizes cooling water and chiller water in a conventional manner. The chiller system 10 illustrated herein is a single stage chiller system. However, it will be apparent to those skilled in the art from this disclosure that the chiller system 10 could be a multiple stage chiller system. The chiller system 10 basically includes a chiller controller 20, a compressor 22, a condenser 24, an expansion valve 26, and an evaporator 28 connected together in series to form a loop refrigeration cycle. In addition, various sensors S and T are disposed throughout the circuit as shown in FIG. 1. The chiller system 10 is conventional except that the chiller system has the liquid injection passage 12 and the hot gas bypass 14 in accordance with the present invention.

Referring to FIGS. 1-5 in the illustrated embodiment, the compressor 22 is a centrifugal compressor. The centrifugal compressor 22 of the illustrated embodiment basically includes a casing 30, an inlet guide vane 32, an impeller 34, a diffuser 36, a motor 38 and a magnetic bearing assembly 40 as well as various conventional sensors (only some shown). The chiller controller 20 receives signals from the various sensors and controls the inlet guide vane 32, the motor 38 and the magnetic bearing assembly 40 in a conventional manner, as explained in more detail below. Refrigerant flows in order through the Inlet guide vane 32, the impeller 34 and the diffuser 36. The inlet guide vane 32 controls the flow rate of refrigerant gas into the impeller 34 in a conventional manner. The impeller 34 increases the velocity of refrigerant gas, generally without changing pressure. The motor speed determines the amount of increase of the velocity of refrigerant gas. The diffuser 36 increases the refrigerant pressure without changing the velocity. The diffuser 36 is non-movably fixed relative to the casing 30. The motor 38 rotates the impeller 34 via a shaft 42. The magnetic bearing assembly 40 magnetically supports the shaft 42. In this manner, the refrigerant is compressed in the centrifugal compressor 22.

The chiller system 10 is conventional, except that the chiller system 10 has the liquid injection passage 12 and the hot gas bypass 14 in accordance with the present invention. As mentioned above and discussed in more detail below, the liquid injection passage 12 or the hot gas bypass 14 can be eliminated as seen in FIGS. 2 and 3. The liquid injection passage 12 is provided in the chiller system 10 to inject liquid refrigerant into an entrance (beginning) portion of the diffuser 36 located between the impeller 34 and the diffuser 36, as explained in more detail below. The liquid injection passage 12 includes the first pipe section 12a, the second pipe section 12b, and the liquid injection valve 16 disposed therebetween, as shown in FIGS. 1 and 2. The first pipe section 12a extends from an outlet port (bottom) of the condenser 24 to the liquid injection valve 16. The second pipe section 12b extends from the liquid injection valve 16 to the entrance portion of the diffuser 36 located between the impeller 34 and the diffuser 36. In this manner, the liquid refrigerant, which has been chilled in the condenser 24, is injected into the entrance portion of the diffuser 36 located between the impeller 34 and the diffuser 36.

Figure 6:
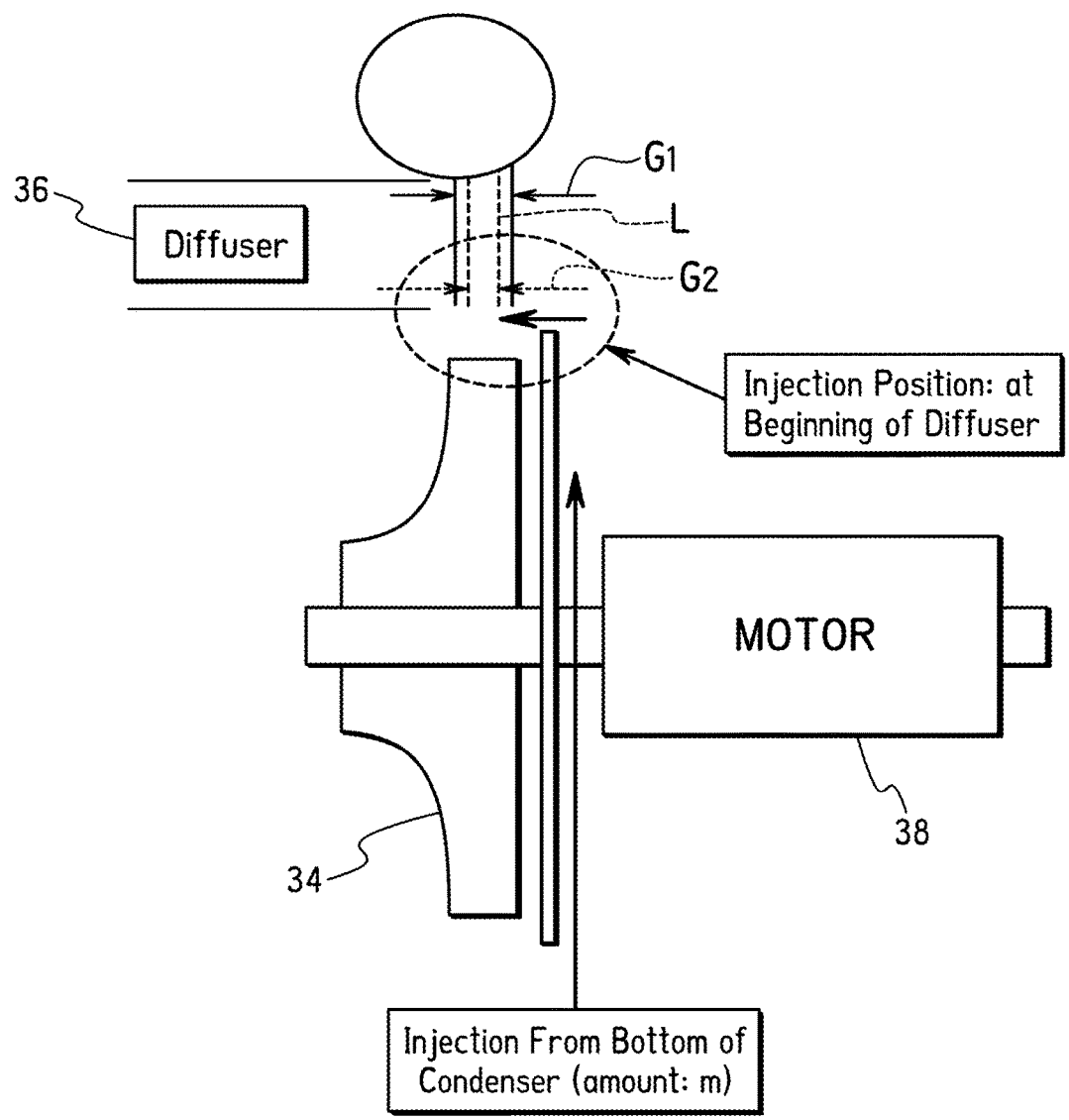
FIG. 6 is a schematic diagram illustrating the impeller, the diffuser, and the motor of the centrifugal compressor of FIGS. 1-5, with liquid injection.

Referring to FIG. 6, the liquid injection valve 16 disposed in the liquid injection passage 12 adjusts an amount "m" of the liquid refrigerant passing through the liquid Injection passage 12. The liquid injection valve 16 is coupled to a liquid injection passage control section 68 of the chiller controller 20, as explained below. The liquid injection passage control section 68 is programmed to control the liquid injection valve 16 so as to adjust the amount "m" of the liquid refrigerant injected into the entrance portion of the diffuser 36 located between the impeller 34 and the diffuser 36, as explained in more detail below.

The liquid injection valve 16 may be a solenoid valve or a variable degree expansion valve. A solenoid valve is an electromechanically operated valve controlled by a solenoid in which the flow is switched on or off intermittently. A variable degree expansion valve is an electromechanically operated valve arranged such that the opening degree of the expansion valve is adjustable. Examples of the variable degree expansion valve include a ball valve and a motor-operated valve. The liquid injection valve 16 may be a single valve or a plurality of valves. For example, a plurality of solenoid valves may be arranged in parallel to each other. The liquid injection valve 16 may be controlled by a timer coupled to the liquid injection passage control section 68 to automatically open/close the valve when a predetermined amount of time passes.

The hot gas bypass 14 is provided in the chiller system 10 to inject hot gas refrigerant between the inlet guide vane 32 and the impeller 34, as explained in more detail below. The hot gas bypass 14 includes the first pipe section 14a, the second pipe section 14b, and the hot gas valve 18 disposed therebetween, as shown in FIGS. 1 and 3. The first pipe section 14a extends from a discharge side of the compressor 22 to the hot gas valve 18. The second pipe section 14b extends from the hot gas valve 18 toward an area between the inlet guide vane 32 and the impeller 34. In this manner, the hot gas refrigerant, which has been compressed in the compressor 22, is injected between the inlet guide vane 32 and the impeller 34.

The hot gas valve 18 disposed in the hot gas bypass 14 adjusts an amount of the hot gas refrigerant passing through the hot gas bypass 14. The hot gas valve 18 is coupled to a hot gas bypass control section 69 of the chiller controller 20, as explained below. The hot gas bypass control section 69 is programmed to control the hot gas valve 18 so as to adjust the amount of the hot gas refrigerant injected between the inlet guide vane 32 and the impeller 34, as explained in more detail below.

The hot gas valve 18 may be a solenoid valve or a variable degree expansion valve. A solenoid valve is an electromechanically operated valve controlled by a solenoid in which the flow is switched on or off intermittently. A variable degree expansion valve is an electromechanically operated valve arranged such that the opening degree of the expansion valve is adjustable. Examples of the variable degree expansion valve include a ball valve and a motor-operated valve. The hot gas valve 18 may be a single valve or a plurality of valves. For example, a plurality of solenoid valves may be arranged in parallel to each other. The hot gas valve 18 may be controlled by a timer coupled to the hot gas bypass control section 69 to automatically open/close the valve when a predetermined amount of time passes.

Figure 4:
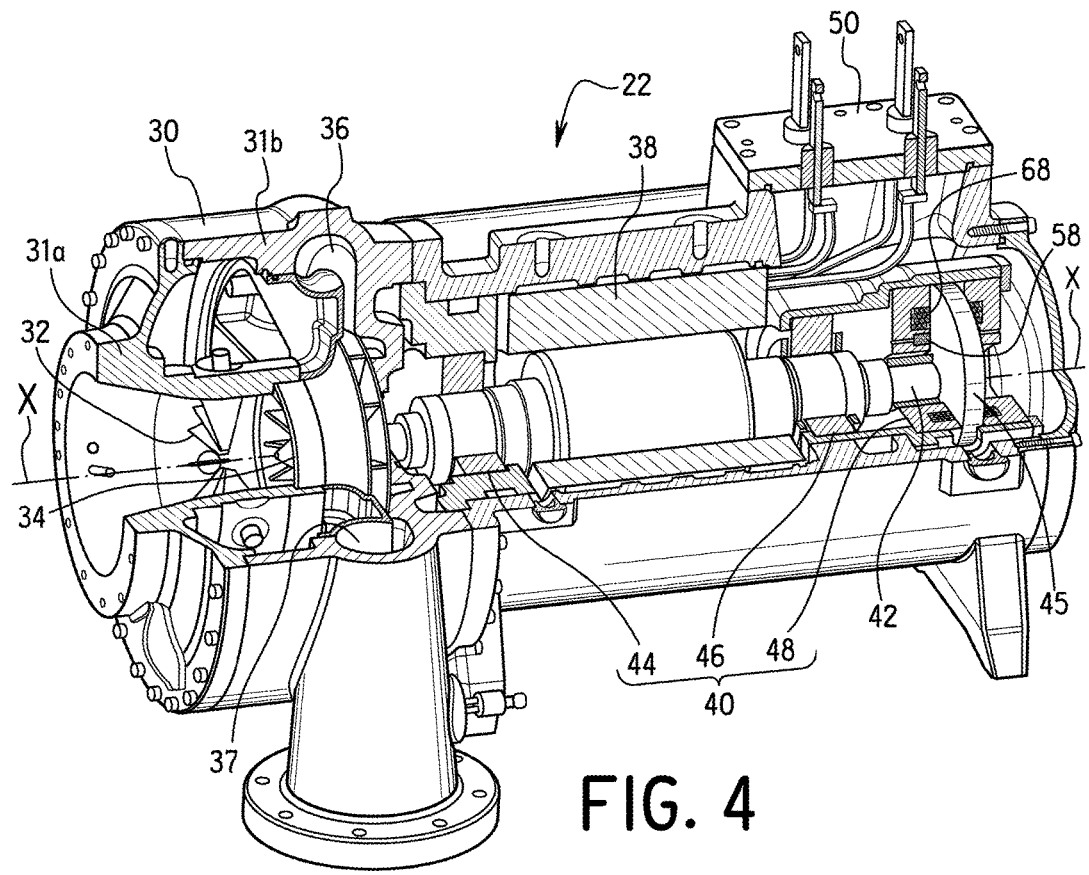
FIG. 4 is a perspective view of the centrifugal compressor of the chiller illustrated in FIG. 1, with portions broken away and shown in cross-section for the purpose of illustration.
Figure 5:
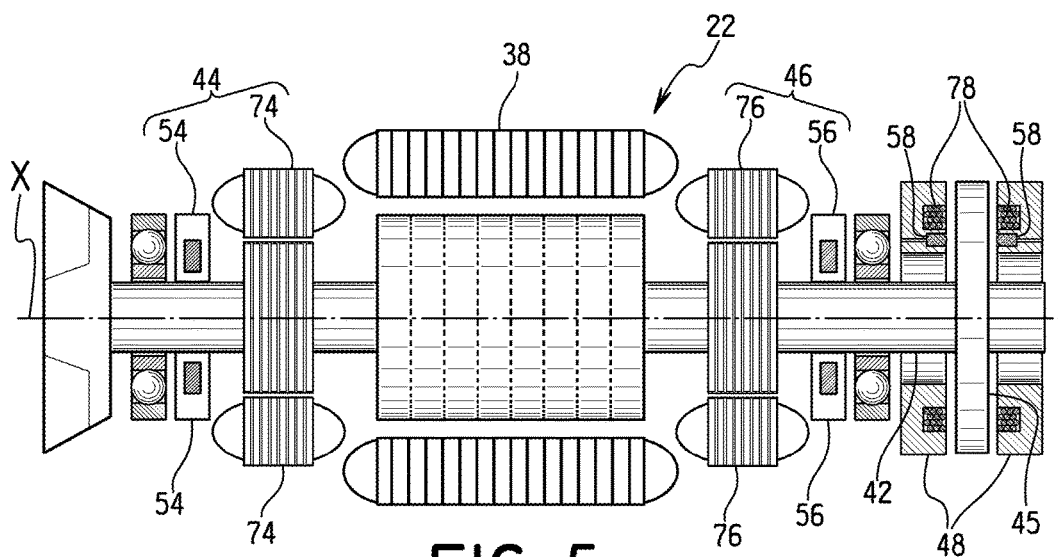
FIG. 5 is a longitudinal cross-sectional view of the impeller, motor and magnetic bearing of the centrifugal compressor illustrated in FIG. 2.

Referring to FIGS. 4 and 5, the magnetic bearing assembly 40 is conventional, and thus, will not be discussed and/or illustrated in detail herein, except as related to the present invention. Rather, it will be apparent to those skilled in the art that any suitable magnetic bearing can be used without departing from the present invention. As seen in FIG. 4, the magnetic bearing assembly 40 preferably includes a first radial magnetic bearing 44, a second radial magnetic bearing 46 and an axial (thrust) magnetic bearing 48. In any case, at least one radial magnetic bearing 44 or 46 rotatably supports the shaft 42. The thrust magnetic bearing 48 supports the shaft 42 along a rotational axis X by acting on a thrust disk 45. The thrust magnetic bearing 48 includes the thrust disk 45 which is attached to the shaft 42.

The thrust disk 45 extends radially from the shaft 42 in a direction perpendicular to the rotational axis X, and is fixed relative to the shaft 42. A position of the shaft 42 along rotational axis X (an axial position) is controlled by an axial position of the thrust disk 45 in accordance with the present invention. The first and second radial magnetic bearings 44 and 46 are disposed on opposite axial ends of the motor 38, or can be disposed on the same axial end with respect to the motor 38 (not illustrated). Various sensors, discussed in more detail below, sense radial and axial positions of the shaft 42 relative to the magnetic bearings 44, 46 and 48, and send signals to the chiller controller 20 in a conventional manner. The chiller controller 20 then controls the electrical current sent to the magnetic bearings 44, 46 and 48 in a conventional manner to maintain the shaft 42 in the correct position. Since the operation of magnetic bearings and magnetic bearing assemblies such as magnetic bearings 44, 46 and 48 of magnetic bearing assembly 40 are well known in the art, the magnetic bearing assembly 40 will not be explained and/or illustrated in detail herein.

The magnetic bearing assembly 40 is preferably a combination of active magnetic bearings 44, 46, and 48, which utilizes non-contact position sensors 54, 56 and 58 to monitor shaft position and send signals indicative of shaft position to the chiller controller 20. Thus, each of the magnetic bearings 44, 46 and 48 are preferably active magnetic bearings. A magnetic bearing control section 61 uses this information to adjust the required current to a magnetic actuator to maintain proper rotor position both radially and axially. Active magnetic bearings are well known in the art, and thus, will not be explained and/or illustrated in detail herein.

Figure 13:
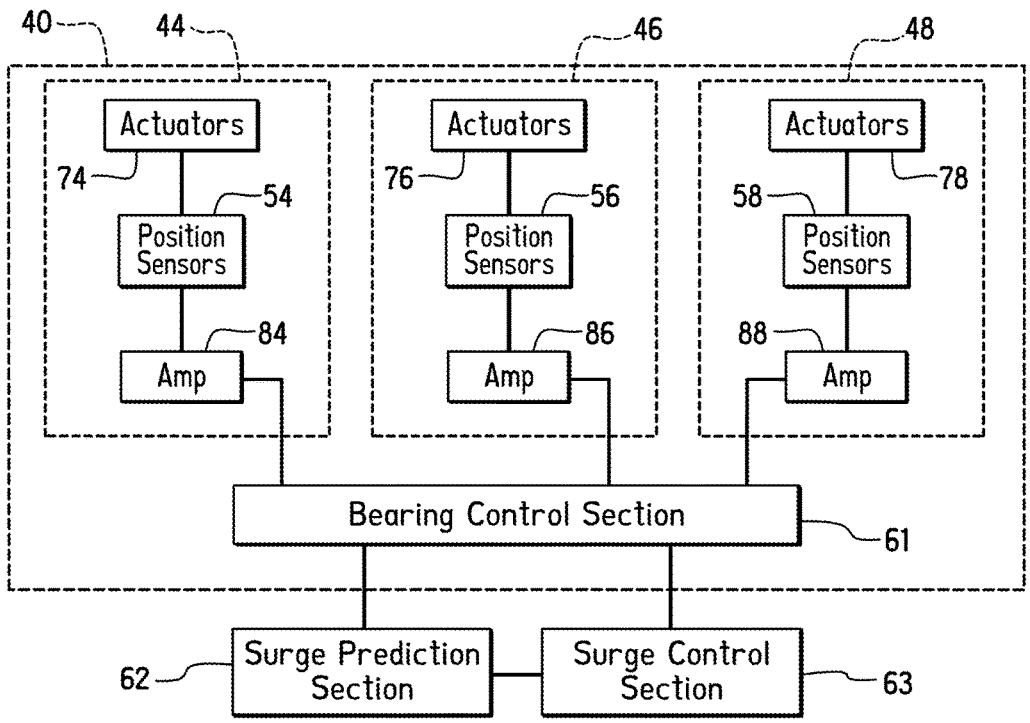
FIG. 13 is a schematic diagram illustrating the relationship between the magnetic bearing assembly, magnetic bearing control section 61, surge prediction section 62, and the surge control section 63 of the chiller system of FIGS. 1-4.
Figure 14:
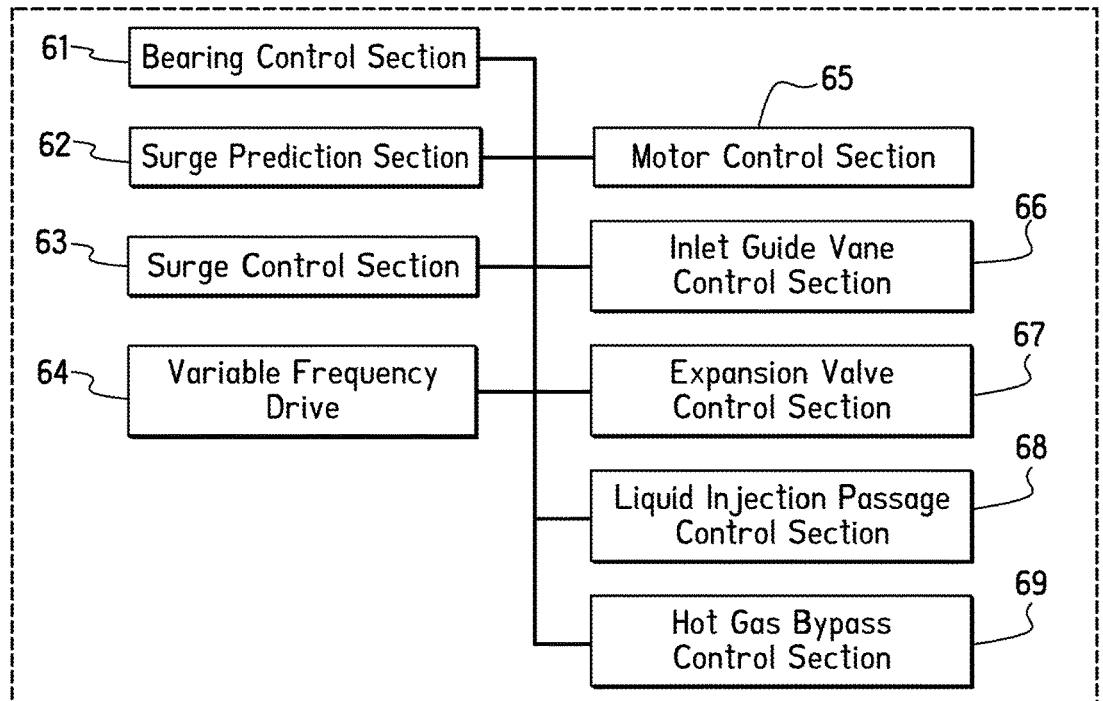
FIG. 14 is a schematic diagram of the chiller controller of the chiller system of FIGS. 1-4.

Referring to FIGS. 1, 13 and 14, the chiller controller 20 includes a magnetic bearing control section 61, a surge prediction section 62, a surge control section 63, a variable frequency drive 64, a motor control section 65, an inlet guide vane control section 66, and an expansion valve control section 67. The chiller controller 20 further includes the liquid injection passage control section 68 and the hot gas bypass control section 69 as mentioned above. The magnetic bearing control section 61, the surge prediction section 62, the surge control section 63, the variable frequency drive 64, the motor control section 65, the inlet guide vane control section 66, the liquid injection passage control section 68 and the hot gas bypass control section 69 are coupled to each other, and form parts of a centrifugal compressor control portion that is electrically coupled to an I/O interface 50 of the compressor 22.

Because the magnetic bearing control section 61 is connected to several portions of the magnetic bearing assembly 40 and communicates with various sections of the chiller controller 20, the various sections of the chiller controller 20 can receive signals from the sensors 54, 56 and 58 of the compressor 22, perform calculations and transmit control signals to parts of the compressor 22 such as the magnetic bearing assembly 40. Similarly, the various sections of the chiller controller 20 can receive signals from the sensors S and T, perform calculations and transmit control signals to the compressor 22 (e.g., the motor) and the expansion valve 26. The control sections and the variable frequency drive 64 can be separate controllers or can be mere sections of the chiller controller programmed to execute the control of the parts described herein. In other words, it will be apparent to those skilled in the art from this disclosure that the precise number, location and/or structure of the control sections, control portion and/or chiller controller 20 can be changed without departing from the present invention so long as the one or more controllers are programmed to execute control of the parts of the chiller system 10 as explained herein.

The chiller controller 20 is conventional, and thus, includes at least one microprocessor or CPU, an Input/output (I/O) interface, Random Access Memory (RAM), Read Only Memory (ROM), a storage device (either temporary or permanent) forming a computer readable medium programmed to execute one or more control programs to control the chiller system 10. The chiller controller 20 may optionally include an input interface such as a keypad to receive inputs from a user and a display device used to display various parameters to a user. The parts and programming are conventional, except as related to controlling surge, and thus, will not be discussed in detail herein, except as needed to understand the embodiment(s).

Liquid Injection

Referring now to FIGS. 1, 2 and 6-8, operation of liquid injection in the chiller system 10 will now be explained in more detail.

As mentioned above, when the compressor 22 operates with small capacity, the liquid injection is performed in order to prevent surge from occurring. In the liquid injection operation, the liquid refrigerant is injected through the liquid injection passage 12 into the entrance portion of the diffuser 36 located between the impeller 34 and the diffuser 36. The amount of the liquid refrigerant passing through the liquid injection passage 12 is adjusted by opening/closing the liquid injection valve 16. The liquid injection passage control section 68 is programmed to open/close the liquid injection valve 16 when the liquid injection passage control section 68 determines that the compressor 22 operates with small capacity. In the illustrated embodiment, the liquid injection passage control section 68 is programmed to determine whether or not the compressor 22 operates with small capacity based on the rpm of the motor 38 and the position of the inlet guide vane 32, as explained in more detail below.

Referring to FIG. 6, the gap $G_1$ of the path of the diffuser 36 can be reduced by injecting the liquid refrigerant L into the entrance portion of the diffuser 36 without using a conventional movable wall for the diffuser 36. More specifically, as the injected liquid refrigerant L occupies a larger area in the path of the diffuser 36, the ratio of gas in the path of the diffuser 36 becomes smaller as illustrated as the gap $G_2$ in FIG. 6, which can increase the gas velocity at the path of the diffuser 36. By increasing the gas velocity at the path of the diffuser 36, the pressure from the diffuser 36 is increased, and thus the back pressure which causes surge can be reduced. Also, when the compressor 22 operates with small capacity, the operation range of the compressor 22 can be expanded with the increased gas velocity. Moreover, in accordance with the present invention, the gap of the path of the diffuser 36 can be easily controlled by adjusting the amount of the injected liquid refrigerant, and thus the performance of the diffuser 36 can be easily optimized for both the full load condition and the small load condition of the compressor 22.

Next, referring to FIGS. 7 and 8, first and second methods of liquid injection control will be explained in detail. The first method of liquid injection control in which a solenoid valve is used as the liquid injection valve 16 (FIG. 7) and the second method of liquid injection control in which a variable degree expansion valve is used as the liquid injection valve 16 (FIG. 8A) will be explained in detail, respectively. The first and second methods of liquid injection control can achieve the same goal, i.e., surge control. However, different steps are used due to different valves.

Figure 7:
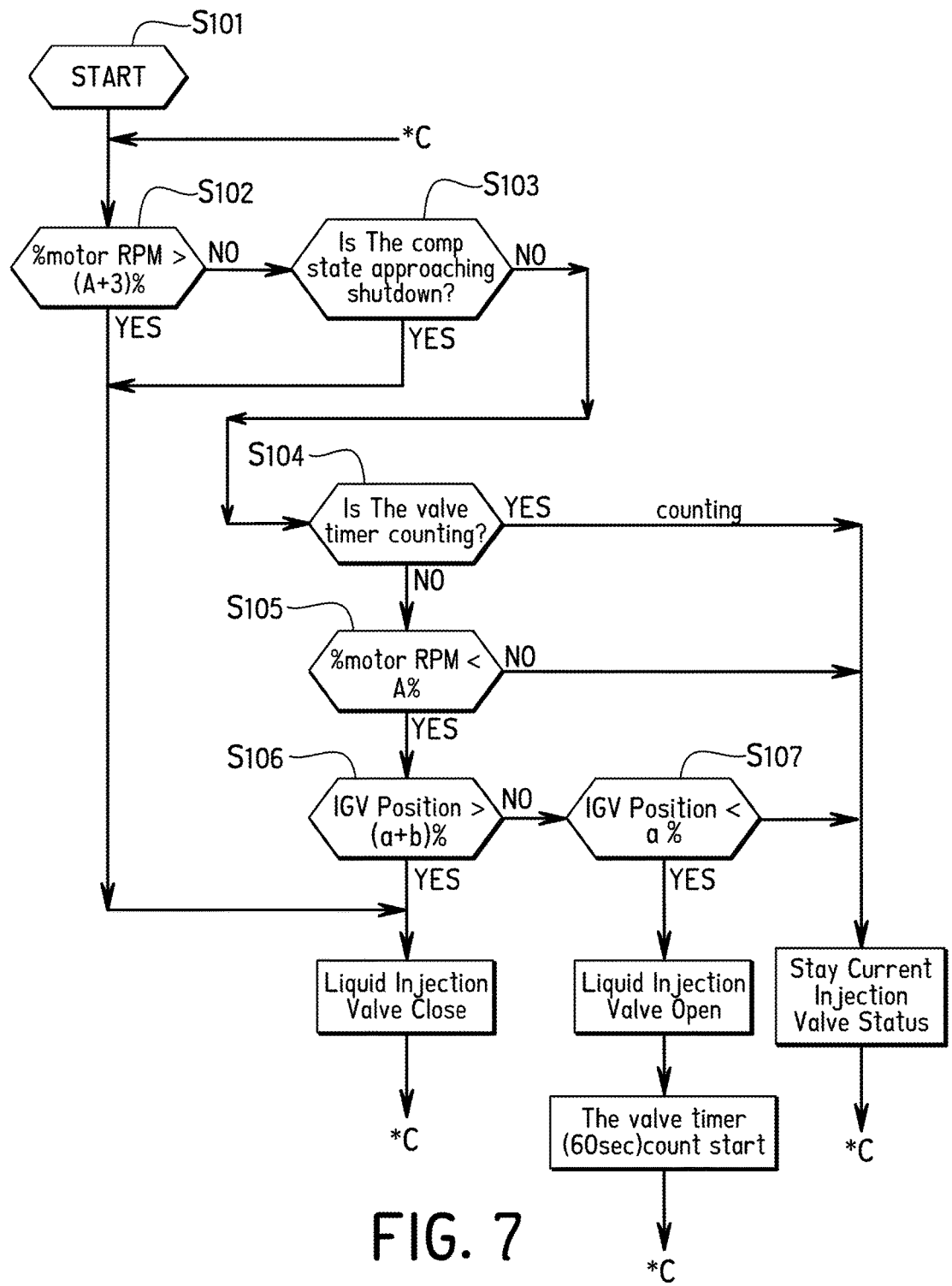
FIG. 7 is a flow chart illustrating a first method of liquid injection control using a solenoid valve as the liquid injection valve.

According to the first method of liquid injection control illustrated in FIG. 7, after startup of the compressor 22 (S101), the liquid injection passage control section 68 is programmed to first determine whether the rpm of the motor 38 is greater than A+3% or not (S102). Here, "A" is a predetermined value and "3" is a margin. The value "A" can be a threshold value of the rpm of the motor 38 where surge has been observed during testing. The margin can be added to make sure that no surge will occur. When the liquid injection passage control section 68 determines that the rpm of the motor 38 is greater than A+3% (Yes in S102), the liquid injection valve (solenoid valve) 16 is closed. No surge should occur here.

When the liquid injection passage control section 68 determines that the rpm of the motor 38 is not greater than A+3% (No in S102), the liquid injection passage control section 68 proceeds to S103 in which the liquid injection passage control section 68 determines whether the compressor 22 is approaching shutdown or not (S103). For example, the liquid injection passage control section 68 may be programmed to determine that the compressor 22 is approaching shutdown in a case where a rapid stop occurs in the compressor 22. The rapid stop in the compressor 22 could be monitored by sending a signal to the compressor 22 and determining if the signal is sent back from the compressor 22. Also, an alarm system may be used in a case of detecting a rapid stop. When the liquid injection passage control section 68 determines that the compressor 22 is approaching shutdown (Yes in S103), the liquid injection valve (solenoid valve) 16 is closed.

On the other hand, when the liquid injection passage control section 68 determines that the compressor 22 is not approaching shutdown (No in S103), the liquid injection passage control section 68 proceeds to S104 in which the liquid injection passage control section 68 determines whether or not the timer of the liquid injection valve 16 is counting (S104). As mentioned above, the timer is coupled to the liquid injection passage control section 68 so as to automatically open/close the liquid injection valve (solenoid valve) 16 when a predetermined amount of time passes. When the timer of the liquid injection valve 16 is counting (Yes in S104), the current status of the liquid injection valve (solenoid valve) 16 is maintained, and the liquid injection valve (solenoid valve) 16 is automatically opened/closed when a predetermined amount of time passes.

In S104, when the timer of the liquid injection valve 16 is not counting (No in S104), the liquid injection passage control section 68 proceeds to S105 in which the liquid injection passage control section 68 determines whether the rpm of the motor 38 is less than A % or not (S105). When the liquid injection passage control section 68 determines that the rpm of the motor 38 is not less than A % (No in S105), the current status of the liquid injection valve (solenoid valve) 16 is maintained.

On the other hand, when the liquid injection passage control section 68 determines that the rpm of the motor 38 is less than A %, (Yes in S105), the liquid injection passage control section 68 proceeds to S106 in which the liquid injection passage control section 68 determines whether the position of the inlet guide vane 32 is greater than a+b % or not (S106). Here, "a" is a predetermined value and "b" is a margin. The value "a" can be a threshold value of the position of the inlet guide vane 32 where surge has been observed during testing. The margin "b" can be determined to make sure that no surge will occur. When the liquid injection passage control section 68 determines that the position of the inlet guide vane 32 is greater than a+b % (Yes in S106), the liquid injection valve (solenoid valve) 16 is closed.

In S106, when the liquid injection passage control section 68 determines that the position of the inlet guide vane 32 is not greater than a+b % (No in S106), the liquid injection passage control section 68 proceeds to S107 in which the liquid injection passage control section 68 determines whether the position of the inlet guide vane 32 is less than a % or not (S107). In S107, when the liquid injection passage control section 68 determines that the position of the inlet guide vane 32 is less than a % (Yes in S107), the liquid injection passage control section 68 determines that the compressor 22 operates with small capacity and the liquid injection valve (solenoid valve) 16 is opened. The liquid injection passage control section 68 may be programmed to keep the liquid injection valve (solenoid valve) 16 open as long as the rpm of the motor 38 and the position of the inlet guide vane 32 remain in the above-mentioned ranges (i.e., the rpm of the motor 38<A % and the position of the inlet guide vane 32<a %). Alternatively, when the liquid injection passage control section 68 determines that the position of the inlet guide vane 32 goes back to a % or more, the liquid injection passage control section 68 may be programmed to set the timer of the liquid injection valve 16 to count a predetermined amount of time. Then, the liquid injection valve (solenoid valve) 16 may be closed after the predetermined amount of time passes. In the illustrated embodiment, the predetermined amount of time is 60 seconds. In this manner, frequent switching on/off of the valve 16 can be avoided.

In S107, when the liquid injection passage control section 68 determines that the position of the inlet guide vane 32 is not less than a % (No in S107), the current status of the liquid injection valve (solenoid valve) 16 is maintained.

In the illustrated embodiment explained above, the values "A", "a" and "b" could be set to a desired value by an installing technician or an operator of the chiller system 10 taking into account the sizes or models of the components of the chiller system 10. Alternatively, the values "A", "a" and "b" could be set in the factory based on the results of experiments. Also, the liquid injection passage control section 68 may be further programmed to prohibit the liquid injection valve 16 from being opened within 5 minutes after the compressor 22 starts.

According to the second method of liquid injection control illustrated in FIG. 8A, after startup of the compressor 22 (S201), the liquid injection passage control section 68 is programmed to first determine whether the position of the Inlet guide vane 32 is greater than a % or not (S202). When the liquid injection passage control section 68 determines that the position of the inlet guide vane 32 is greater than a % (Yes in S202), the liquid injection valve (variable degree expansion valve) 16 is closed. Alternatively, the liquid injection passage control section 68 may be programmed to determine whether the rpm of the motor 38 is greater than A % or not in S202.

When the liquid injection passage control section 68 determines that the position of the inlet guide vane 32 is not greater than a % (No in S202), the liquid injection passage control section 68 proceeds to S203 in which the liquid injection passage control section 68 determines whether the compressor 22 is approaching shutdown or not (S203). For example, the liquid injection passage control section 68 may be programmed to determine that the compressor 22 is approaching shutdown in a case where a rapid stop occurs in the compressor 22. The rapid stop could be monitored by sending a signal to the compressor 22 and determining if the signal is sent back from the compressor 22. Also, an alarm system may be used in a case of detecting a rapid stop. When the liquid injection passage control section 68 determines that the compressor 22 is approaching shutdown (Yes in S203), the liquid injection valve (variable degree expansion valve) 16 is closed.

On the other hand, when the liquid injection passage control section 68 determines that the compressor 22 is not approaching shutdown (No in S203), the liquid injection passage control section 68 proceeds to S204 in which the liquid injection passage control section 68 opens the liquid injection valve (variable degree expansion valve) 16. In S204, the opening degree of the liquid injection valve (variable degree expansion valve) 16 is determined based on a function $f$ (Pressure ratio, IGV). More specifically, the opening degree of the liquid injection valve (variable degree expansion valve) 16 is determined based on a function $f$ of the pressure ratio of suction pressure to discharge pressure and the position of the inlet guide vane 32 as illustrated in FIG. 8B. When the position of the inlet guide vane 32 is equal to or less than a %, it is determined whether the liquid injection valve (variable degree expansion valve) 16 will be opened or not. See FIG. 8C. Further, when the position of the inlet guide vane 32 is equal to or less than a %, the opening degree of the liquid injection valve (variable degree expansion valve) 16 is adjusted in proportion to the pressure ratio of suction pressure to discharge pressure as illustrated in FIG. 8D. However, when the pressure ratio of suction pressure to discharge pressure is equal to or less than 1.5, the liquid injection valve (variable degree expansion valve) 16 is not opened (closed). Also, when the pressure ratio of suction pressure to discharge pressure exceeds 2.5, the opening degree of the liquid injection valve (variable degree expansion valve) 16 is maintained to be an opening degree in a case where the pressure ratio of suction pressure to discharge pressure is 2.5.

After opening the liquid injection valve (variable degree expansion valve) 16, the liquid injection passage control section 68 continues to monitor the position of the Inlet guide vane 32. The liquid injection passage control section 68 may be programmed to keep the liquid injection valve (variable degree expansion valve) 16 open until the liquid injection passage control section 68 determines that the position of the inlet guide vane 32 goes back to a % or more. When the liquid injection passage control section 68 determines that the position of the inlet guide vane 32 goes back to a % or more, the liquid injection passage control section 68 then closes the liquid injection valve (variable degree expansion valve) 16.

In the illustrated embodiment explained above, the value "a" could be set to a desired value by an installing technician or an operator of the chiller system 10 taking into account the sizes or models of the components of the chiller system 10. Alternatively, the value "a" could be set in the factory based on the results of experiments. Also, the liquid injection passage control section 68 may be further programmed to prohibit the liquid injection valve 16 from being opened within 5 minutes after the compressor 22 starts.

The chiller controller 20 may be programmed to perform hot gas injection discussed below when the chiller controller 20 determines that hot gas injection is needed after performing the liquid injection discussed above.

Hot Gas Injection

Referring now to FIGS. 1, 3, 9 and 10, operation of hot gas injection in the chiller system 10 will now be explained in more detail.

In the hot gas injection, the hot gas refrigerant is injected through the hot gas bypass 14 between the inlet guide vane 32 and the impeller 34. The amount of the hot gas refrigerant passing through the hot gas bypass 14 is adjusted by opening/closing the hot gas valve 18. The hot gas bypass control section 69 is programmed to open/close the hot gas valve 18, as explained in more detail below.

Figure 9:
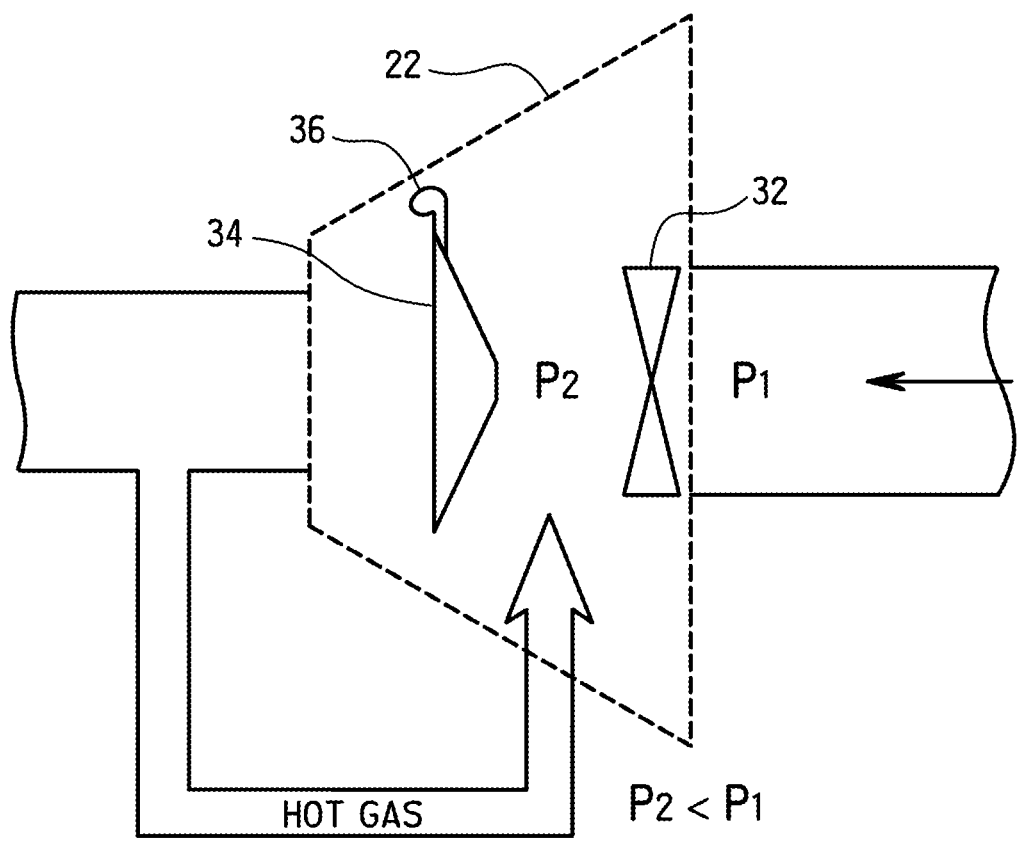
FIG. 9 is a schematic diagram illustrating the inlet guide vane, the impeller, and the diffuser of the centrifugal compressor of FIGS. 1-5, with hot gas injection.

Referring to FIG. 9, the hot gas refrigerant is injected into an area between the inlet guide vane 32 and the impeller 34. The pressure P2 at the area between the inlet guide vane 32 and the impeller 34 is smaller than the pressure P1 at the suction side of the compressor 22 into which the hot gas refrigerant is injected in accordance with a conventional technique. The flow rate of gas in a pipe is determined based on the pressure difference and the inner diameter of the pipe. More specifically, a small inner diameter of the pipe can achieve a high flow rate when the pressure difference becomes large. Accordingly, by injecting the hot gas refrigerant into the area of the pressure P2 which is smaller than the pressure P1, the pressure difference ΔP2 (the pressure at the discharge side of the compressor−P2) is larger than the pressure difference ΔP1 (the pressure at the discharge side of the compressor−P1), and thus, a sufficiently high flow rate of gas can be achieved with a smaller diameter pipe. In this manner, a small-sized pipe can be used as the hot gas bypass 16 in accordance with the present invention.

Moreover, gas turbulence easily occurs at the area between the inlet guide vane 32 and the impeller 34, which causes a shaft vibration when the inlet guide vane opening position is small in a case of the magnetic bearing. By injecting the hot gas refrigerant into the area between the inlet guide vane 32 and the impeller 34, such gas turbulence can be reduced, and a shaft vibration in the magnetic bearing can be lowered.

Figures 10A, 10B:
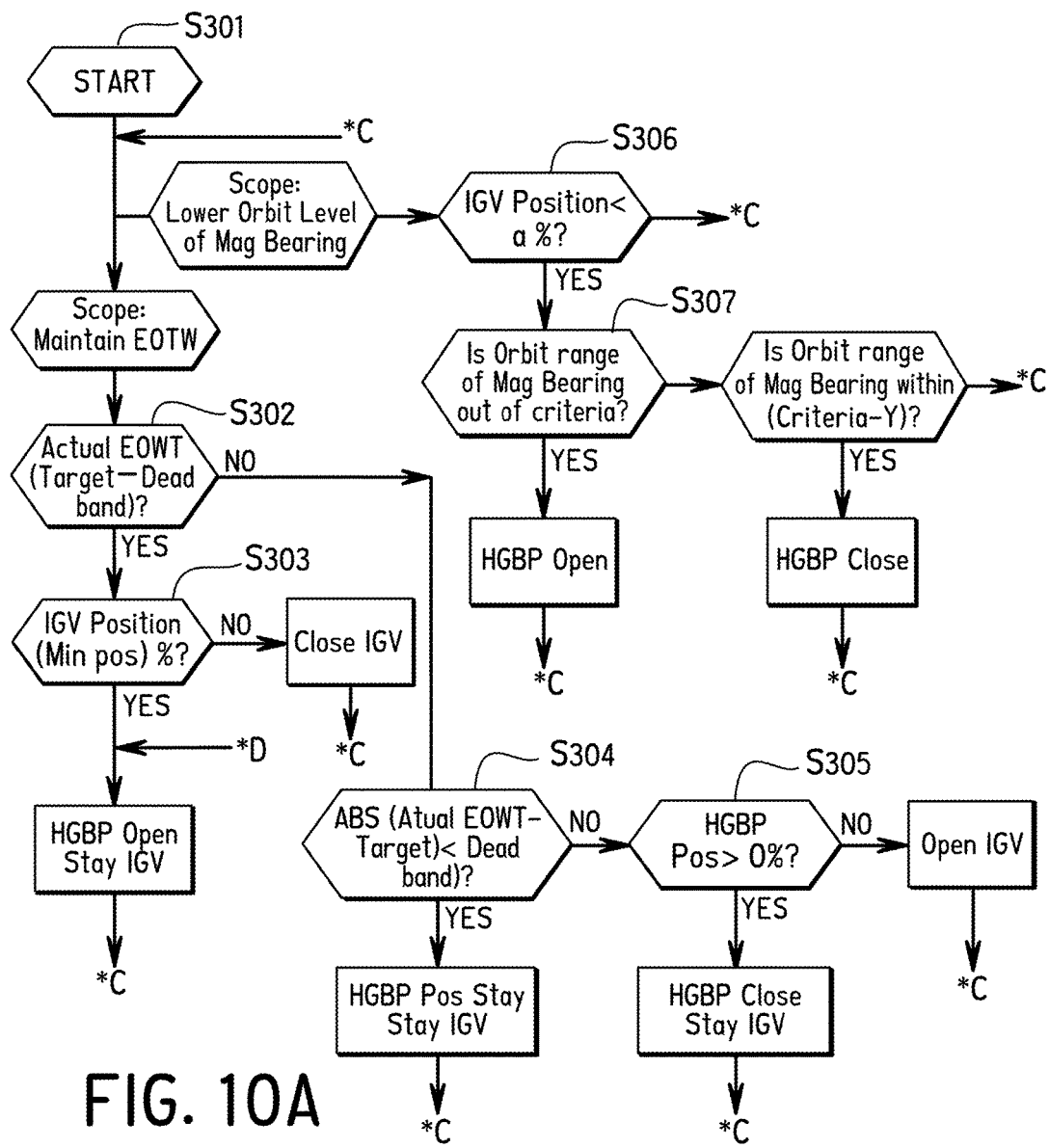
FIG. 10A is a flow chart illustrating a method of hot gas injection control.
FIG. 10B illustrates opening/closing of the hot gas bypass.
Figure 11:
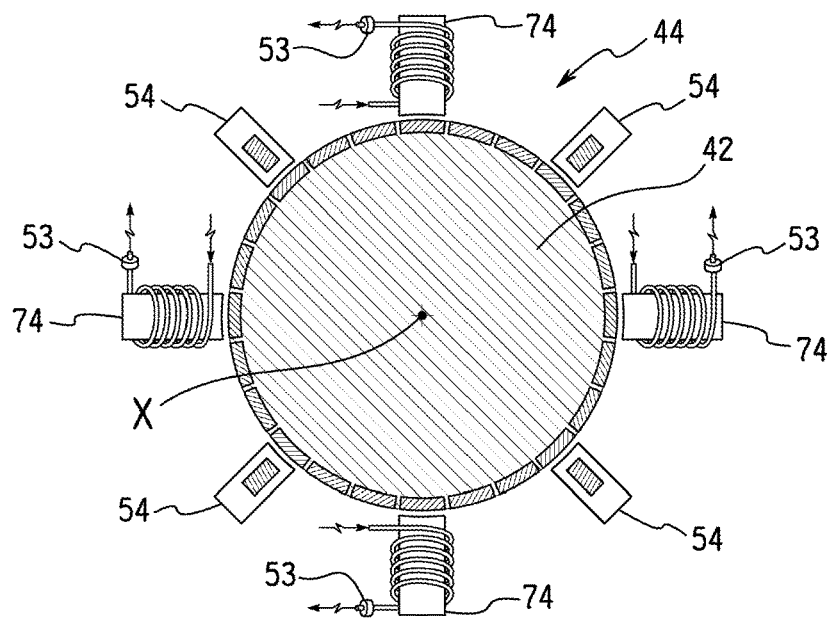
FIG. 11 is an axial view of the shaft of the rotational magnetic bearing illustrating a location of a radial magnetic bearing.

According to a method of hot gas injection control illustrated in FIG. 10A, after startup of the compressor 22 (S301), the hot gas bypass control section 69 is programmed to determine whether an actual water temperature at the outlet of the evaporator 28 is less than a predetermined value or not (S302). The water temperature at the outlet of the evaporator 28 is hereinafter referred to as EOWT. The predetermined value in S302 is determined based on the difference between the target value and the dead band value of the EOWT. Here, the target value is a desired value of the EOWT which is set by an installing technician or an operator taking into account the sizes or models of the components of the chiller system 10. The dead band value is a value range in which a change in the EOWT will not cause an observable response in the subsequent chiller process. The target value and the dead band value of the EOWT could be set in the factory based on the results of experiments.

When the hot gas bypass control section 69 determines that the actual EOWT is less than the predetermined value (Yes in S302), the hot gas bypass control section 69 proceeds to S303 in which the hot gas bypass control section 69 determines whether the position of the Inlet guide vane 32 is less than a minimum position % or not (S303).

In S303, when the hot gas bypass control section 69 determines that the position of the inlet guide vane 32 is less than a minimum position % (Yes in S303), the hot gas valve 18 is opened and the inlet guide vane 32 is controlled to stay in the current position. The hot gas bypass control section 69 may be further programmed to keep the hot gas valve 18 open such that the actual EOWT reaches the target value.

In S303, when the hot gas bypass control section 69 determines that the position of the inlet guide vane 32 is not less than a minimum position % (No in S303), the inlet guide vane 32 is closed.

On the other hand, in S302, when the hot gas bypass control section 69 determines that the actual EOWT is not less than the predetermined value (No in S302), the hot gas bypass control section 69 proceeds to S304 in which the hot gas bypass control section 69 determines whether the absolute value of the difference between the actual value and the target value of the EOWT is less than the dead band value or not (S304).

In S304, when the hot gas bypass control section 69 determines that the absolute value of the difference between the actual value and the target value of the EOWT is less than the dead band value (Yes in S304), the hot gas valve 18 and the inlet guide vane 32 are controlled to stay in the current positions. In S304, when the hot gas bypass control section 69 determines that the absolute value of the difference between the actual value and the target value of the EOWT is not less than the dead band value (No in S304), the hot gas bypass control section 69 proceeds to S305 in which the hot gas bypass control section 69 determines whether the position of the hot gas valve 18 is greater than 0% (S305).

In S305, when the hot gas bypass control section 69 determines that the position of the hot gas valve 18 is greater than 0% (Yes in S305), the hot gas valve 18 is closed and the inlet guide vane 32 is controlled to stay in the current position. On the other hand, in S305, when the hot gas bypass control section 69 determines that the position of the hot gas valve 18 is not greater than 0% (No in S305), the inlet guide vane 32 is opened. The hot gas bypass control section 69 may be further programmed to close the hot gas injection valve 18 back to the zero position and subsequently open the inlet guide vane 32 when a required load of the centrifugal compressor 22 increases.

After startup of the compressor 22 (S301), the hot gas bypass control section 69 may proceed to S306. In S306, the hot gas bypass control section 69 determines whether that the position of the inlet guide vane 32 is less than a %. "a" is a predetermined value. The value "a" can be a threshold value of the position of the inlet guide vane 32 where surge has been observed during testing. When the hot gas bypass control section 69 determines that the position of the inlet guide vane 32 is less than a % (Yes in S306), the hot gas bypass control section 69 proceeds to S307 in which the hot gas bypass control section 69 determines whether the position of the magnetic bearing 44, 46 or 48 is out of a predetermined orbit range or not (S307). Here, the hot gas bypass control section 69 may be programmed to determine the position of the magnetic bearings 44, 46, or 48 of the magnetic bearing assembly 40 by receiving signals from the position sensors 54, 56 and 58 through the magnetic bearing control section 61, as explained in more detail below.

When the hot gas bypass control section 69 determines that the position of the magnetic bearing 44, 46 or 48 is out of a predetermined orbit range, the hot gas bypass control section 69 opens the hot gas valve 18 so as to return the magnetic bearing 44, 46 or 48 to a position within the predetermined orbit range. This process of opening the hot gas valve 18 overrides the above-mentioned processes of closing the hot gas valve 18 and controlling the hot gas valve 18 to stay in the current position. By opening the hot gas valve 18 to inject the hot gas refrigerant between the inlet guide vane 32 and the impeller 34 in this manner, gas turbulence at the area between the inlet guide vane 32 and the impeller 34 can be reduced, and the level of the shaft vibration in the magnetic bearing 44, 46 or 48 can be lowered.

The chiller controller 20 is programmed to shut down the centrifugal compressor 22 in a conventional manner when the shaft vibration in the magnetic bearing 44, 46 or 48 exceeds an acceptable level and the position of the magnetic bearing 44, 46 or 48 is out of a desired orbit range. In S307, the predetermined orbit range of the magnetic bearing 44, 46 or 48 could be set smaller than the orbit range of the magnetic bearing 44, 46 or 48 in which the centrifugal compressor 22 is arranged to shut down.

The chiller controller 20 may be programmed to perform the liquid injection when the chiller controller 20 determines that liquid injection is needed after performing the hot gas injection discussed above.

The magnetic bearing control section 61 normally receives signals from the sensors 54, 56 and 58 of the magnetic bearing assembly 40, and transmits electrical signals to the magnetic bearings 44, 46 and 48 to maintain the shaft 42 in the desired position in a conventional manner. More specifically, the magnetic bearing control section 61 is programmed to execute a magnetic bearing control program to maintain the shaft 42 in the desired position in a conventional manner during normal operation when surge is not predicted. However, if surge is predicted, the axial position of the shaft 42 can be adjusted using the surge control section 62 and the axial magnetic bearing 48. Thus, the axial position of the impeller 34, which is fixed to the shaft 42, can be adjusted relative to the diffuser 36, as explained in more detail below.

The variable frequency drive 64 and motor control section 65 receive signals from at least one motor sensor (not shown) and control the rotation speed of the motor 38 to control the capacity of the compressor 22 in a conventional manner. More specifically, the variable frequency drive 64 and motor control section 65 are programmed to execute one or more motor control programs to control the rotation speed of the motor 38 to control the capacity of the compressor 22 in a conventional manner. The inlet guide vane control section 66 receives signals from at least one inlet guide vane sensor (not shown) and controls the position of the inlet guide vane 32 to control the capacity of the compressor 22 in a conventional manner. More specifically, the inlet guide vane control section 66 is programmed to execute an inlet guide vane control program to control the position of the inlet guide vane 32 to control the capacity of the compressor 22 in a conventional manner. The expansion valve control section 67 controls the opening position of the expansion valve 26 to control the capacity of the chiller system 10 in a conventional manner. More specifically, the expansion valve control section 67 is programmed to execute an expansion valve control program to control the opening position of the expansion valve 26 to control the capacity of the chiller system 10 in a conventional manner. The motor control section 65 and the inlet guide vane control section 66 work together and with the expansion valve control section 67 to control the overall capacity of the chiller system 10 in a conventional manner. The chiller controller 20 receives signals from the sensors S and optionally T to control the overall capacity in a conventional manner. The optional sensors T are temperature sensors. The sensors S are preferably conventional pressure sensors and/or temperature sensors used in a conventional manner to perform the control.

Each the magnetic bearing 44 includes a plurality of actuators 74 and at least one amp 84. Similarly, each the magnetic bearing 46 includes a plurality of actuators 76 and at least one amplifier 86. Likewise, Each the magnetic bearing 48 includes a plurality of actuators 78 and at least one amp 88. The amplifiers 84, 86 and 88 of each magnetic bearing 44, 46, and 48 may be a multi-channel amp to control the number actuators thereof, or can include separate amplifiers for each actuator 74, 76 and 78. In either case, the amplifiers 84, 86 and 88 are electrically connected to the actuators 74, 76 and 78 of each respective magnetic bearing 44, 46, and 48.

Referring to FIGS. 13 and 14, the magnetic bearing control section 61 is electrically connected to the surge control section 63, and receives signals from the surge control section 63. The magnetic bearing control section 61 can adjust the desired axial position of the shaft 42 to be any point within a shiftable range of the magnetic bearing 48. In the illustrated embodiment, the shiftable range of the magnetic bearing 48 is preferably between 200 mm and 300 mm. The magnetic bearing control section 61 is programmed to adjust the electrical signal to the amplifier 88 of the magnetic bearing 48 to adjust the axial position of the shaft 42. The magnetic bearing 48 may include an amplifier 88 with two channels to independently control each actuator 78 of the magnetic bearing 48 respectively, or each actuator 78 of the magnetic bearing 48 may have a unique corresponding amplifier 88. The actuators 78 of the magnetic bearing 48 act on the thrust disk 45 by exerting a magnetic force. The actuators 78 of the magnetic bearing 48 generate a magnetic force which is based upon an electrical current. Thus, the magnetic force can be variably controlled by controlling the amount of current supplied to each actuator 78, as will be explained in further detail below.

In the illustrated embodiment, the magnetic bearing 48 includes the thrust disk 45, two actuators 78 disposed on opposite sides of the thrust disk 45, two position sensors 58 disposed on opposite sides of the thrust disk 45, an amplifier 88 electrically connected to the two actuators 78, and the magnetic bearing control section 61. The magnetic bearing control section 61 is electrically connected to the position sensors 58, the amplifier 88, and the other portions of the chiller controller 20. Each actuator 78 receives a respective current from the amplifier 88, and each current being determined by the magnetic bearing control section 61 and communicated to the amplifier 88 by a signal. The actuators 78 of the magnetic bearing 48 bias the thrust disk 45 to an axial position in which the net force of the two actuators 78 reach equilibrium.

Conventionally, the inlet guide vane control section 66 controls the flow rate of refrigerant gas into the impeller by controlling the inlet guide vane 32. For example, the guide vane control section may determine a target capacity of the system, determine the amount of adjustment to the guide vane 32 necessary to reach the target capacity, and control the guide vane 32 to achieve the target capacity. However, when a magnetic bearing is used in the centrifugal compressor, an allowable inlet guide vane closing position is limited to avoid a large shaft vibration caused by gas turbulence which occurs between the inlet guide vane and the impeller. Some centrifugal compressors utilize an adjustable diffuser wall to have surge control capability.

By controlling surge using the techniques described herein, the chiller system 10 is no longer limited to controlling surge by limiting the inlet guide vane position, and/or an adjustable diffuser wall. In addition other adjustment structures may possibly be eliminated or made unnecessary. In other words, the diffuser may have no adjustable diffuser walls (not illustrated). By foregoing the guide vane 32, the reliability of chiller system 10 may be increased, and the cost may be decreased.

Figure 12:
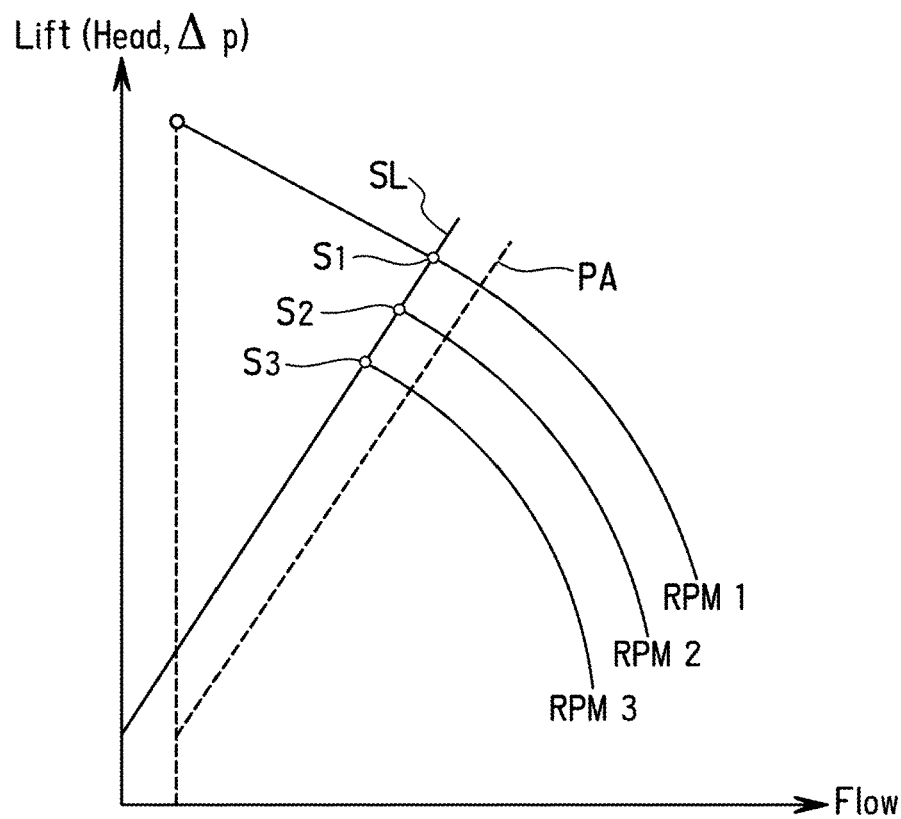
FIG. 12 is graph illustrating head as compared to flow rate for three different rpm of the centrifugal compressor, with a surge line illustrated.

Referring to FIG. 12, surge is the complete breakdown of steady flow in the compressor, which typically occurs at a low flow rate. FIG. 12 illustrates a surge line SL, which connects the surge points S1, S2, and S3 at rpm1, rpm2, and rpm3, respectively. These points are the peak points in which pressure generated by the compressor is less than the pipe pressure downstream of the compressor. These points illustrate initiation of the surge cycle. Broken line PA illustrates a surge control line. The distance between line PA and SL show the inefficiency of surge control methods. By reducing the difference between a surge control line PA and surge line SL, the compressor 22 can be controlled to be more efficient. One advantage of the aforementioned surge control methods is that it provides novel methods of controlling surge; thus the surge control line PA may be closer to surge line SL when compared to previous methods.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A centrifugal compressor adapted to be used in a chiller, the centrifugal compressor comprising:
a casing having an inlet portion and an outlet portion;
an inlet guide vane disposed in the inlet portion;
an impeller disposed downstream of the inlet guide vane, the impeller being attached to a shaft rotatable about a rotation axis;
a motor arranged and configured to rotate the shaft in order to rotate the impeller;
a diffuser disposed in the outlet portion downstream from the impeller with an outlet port of the outlet portion being disposed between the impeller and the diffuser;
a hot gas injection passage arranged and configured to inject hot gas refrigerant between the inlet guide vane and the impeller; and
a controller programmed to control an amount of hot gas refrigerant injected between the inlet guide vane and the impeller,
the controller being further programmed to inject the hot gas refrigerant between the inlet guide vane and the impeller when an evaporator outlet water temperature is less than a predetermined value and a position of the inlet guide vane is less than a predetermined position value.

2. The centrifugal compressor according to claim 1, wherein
the controller is further programmed to inject the hot gas refrigerant between the inlet guide vane and the impeller such that the evaporator outlet water temperature reaches a target value.

3. The centrifugal compressor according to claim 1, further comprising
a magnetic bearing rotatably supporting the shaft.

4. The centrifugal compressor according to claim 3, wherein
the controller is further programmed to inject the hot gas refrigerant between the inlet guide vane and the impeller when a position of the magnetic bearing is out of a predetermined orbit range so as to return the magnetic bearing to a position within the predetermined orbit range.

5. The centrifugal compressor according to claim 4, wherein
the predetermined orbit range of the magnetic bearing is set smaller than an orbit range of the magnetic bearing in which the centrifugal compressor is arranged to shut down.

6. The centrifugal compressor according to claim 1, wherein
the hot gas injection passage includes an at least one valve disposed therein, the at least one valve being controlled by the controller to control an amount of hot gas refrigerant injected between the inlet guide vane and the impeller.

7. The centrifugal compressor according to claim 6, wherein
the at least one valve includes a solenoid valve.

8. The centrifugal compressor according to claim 6, wherein
the at least one valve includes a plurality of solenoid valves arranged parallel to each other.

9. The centrifugal compressor according to claim 6, wherein
the at least one valve includes a variable degree expansion valve.

10. The centrifugal compressor according to claim 9, wherein
the variable degree expansion valve includes a ball valve.

11. The centrifugal compressor according to claim 9, wherein
the variable degree expansion valve includes a motor-operated valve.

12. The centrifugal compressor according to claim 6, further comprising
a magnetic bearing rotatably supporting the shaft.

13. The centrifugal compressor according to claim 12, wherein
the controller is further programmed to inject the hot gas refrigerant between the inlet guide vane and the impeller when a position of the magnetic bearing is out of a predetermined orbit range so as to return the magnetic bearing to a position within the predetermined orbit range.

14. The centrifugal compressor according to claim 13, wherein
the predetermined orbit range of the magnetic bearing is set smaller than an orbit range of the magnetic bearing in which the centrifugal compressor is arranged to shut down.

15. A centrifugal compressor adapted to be used in a chiller, the centrifugal compressor comprising:
a casing having an inlet portion and an outlet portion;
an inlet guide vane disposed in the inlet portion;
an impeller disposed downstream of the inlet guide vane, the impeller being attached to a shaft rotatable about a rotation axis;
a motor arranged and configured to rotate the shaft in order to rotate the impeller;
a diffuser disposed in the outlet portion downstream from the impeller with an outlet port of the outlet portion being disposed between the impeller and the diffuser;
a hot gas injection passage arranged and configured to inject hot gas refrigerant between the inlet guide vane and the impeller; and
a controller programmed to control an amount of hot gas refrigerant injected between the inlet guide vane and the impeller,
the controller being further programmed to close the hot gas injection passage and subsequently open the inlet guide vane when a required load of the centrifugal compressor increases.

\* \* \* \* \*